US012492586B2

United States Patent
Pellegrini

(10) Patent No.: US 12,492,586 B2
(45) Date of Patent: Dec. 9, 2025

(54) LINEAR GUIDE WITHOUT GUIDE RAIL

(71) Applicant: Bode—Die Tür GmbH, Kassel (DE)

(72) Inventor: Andreas Pellegrini, Kassel (DE)

(73) Assignee: BODE—DIE TUR GMBH, Kassel (DE)

( * ) Notice: Subject to any disclaimer, the term of this patent is extended or adjusted under 35 U.S.C. 154(b) by 75 days.

(21) Appl. No.: 18/249,106

(22) PCT Filed: Oct. 11, 2021

(86) PCT No.: PCT/EP2021/078061
§ 371 (c)(1),
(2) Date: Apr. 14, 2023

(87) PCT Pub. No.: WO2022/078964
PCT Pub. Date: Apr. 21, 2022

(65) Prior Publication Data
US 2023/0392424 A1   Dec. 7, 2023

(30) Foreign Application Priority Data
Oct. 16, 2020   (DE) ...................... 20 2020 105 924.6

(51) Int. Cl.
*E05D 15/00*   (2006.01)
*B60J 5/06*   (2006.01)
(Continued)

(52) U.S. Cl.
CPC .......... *E05D 15/0652* (2013.01); *B60J 5/062* (2013.01); *E05D 15/0643* (2013.01);
(Continued)

(58) Field of Classification Search
CPC .......... E05D 15/0652; E05D 15/0643; E05D 15/0621; E05D 15/0686; E05D 15/0647;
(Continued)

(56) References Cited

U.S. PATENT DOCUMENTS 2,023,873 A * 12/1935 De Haven ............ B61D 19/005
                                                          16/88
2,068,674 A    1/1937 Harvey
(Continued)

FOREIGN PATENT DOCUMENTS

EP   1619339 A1   1/2006
EP   1623845 A1 *  2/2006 ............ F16C 13/006
(Continued)

OTHER PUBLICATIONS

International Search Report for International Application No. PCT/EP2021/078061, dated Jan. 17, 2022, 2 pages.

*Primary Examiner* — Chuck Y Mah
(74) *Attorney, Agent, or Firm* — CANTOR COLBURN LLP

(57) ABSTRACT

A guiding device for a door system, in particular a sliding or pivot sliding door system of a public transport vehicle, includes: a longitudinal profile formed from a first material for attachment to a door portal, which has a guiding track, which is U-shaped in cross section, with a bottom surface and two side walls extending at right angles therefrom, a slider, which at least partially reaches into the guiding track and is supported on rolling members in a linearly movable manner in the guiding track, wherein a bearing member formed from a second material is disposed in the guiding track, which extends along the guiding track and on which the rolling members supporting the slider roll during a linear movement of the slider, the second material forming the bearing member is harder than the first material forming the longitudinal profile.

5 Claims, 3 Drawing Sheets

(51) Int. Cl.
*E05D 15/06* (2006.01)
*B61D 19/00* (2006.01)

(52) U.S. Cl.
CPC ....... *B61D 19/005* (2013.01); *E05Y 2800/269* (2024.05); *E05Y 2800/682* (2013.01); *E05Y 2900/506* (2013.01); *E05Y 2900/51* (2013.01)

(58) Field of Classification Search
CPC ... B60J 5/062; B60J 5/065; B60J 5/08; B61D 19/005; B61D 19/007; B61D 19/02; E05Y 2900/506; E05Y 2900/51; E05Y 2900/516; E05Y 2900/518; E05Y 2900/50
See application file for complete search history.

(56) References Cited

U.S. PATENT DOCUMENTS

| | | | | |
|---|---|---|---|---|
| 4,785,494 | A * | 11/1988 | Adamski | E06B 9/58 160/133 |
| 5,893,181 | A * | 4/1999 | Moncaster | E05D 15/0643 4/557 |
| 6,058,656 | A * | 5/2000 | Bischof | E05D 15/063 16/106 |
| 6,945,364 | B1 * | 9/2005 | Wesson | B66B 13/30 187/334 |
| 2006/0207184 | A1 * | 9/2006 | Whitaker | E05D 15/063 49/409 |
| 2006/0230575 | A1 * | 10/2006 | Quinn | E05D 15/0647 16/87.2 |
| 2008/0092450 | A1 * | 4/2008 | Balduck | E05D 15/0652 49/404 |
| 2011/0094162 | A1 * | 4/2011 | Morris | A47H 23/04 16/94 R |
| 2011/0209306 | A1 | 9/2011 | Pritz et al. | |
| 2014/0208545 | A1 * | 7/2014 | Jang | E06B 3/44 16/96 R |
| 2020/0071631 | A1 * | 3/2020 | Andersson | C10M 129/20 |
| 2020/0080362 | A1 * | 3/2020 | Siller | E06B 1/70 |
| 2021/0332631 | A1 * | 10/2021 | Ma | E06B 3/4415 |

FOREIGN PATENT DOCUMENTS

| | | |
|---|---|---|
| EP | 1637684 A2 | 3/2006 |
| EP | 1914372 A2 | 4/2008 |
| WO | 2007128771 A1 | 11/2007 |

* cited by examiner

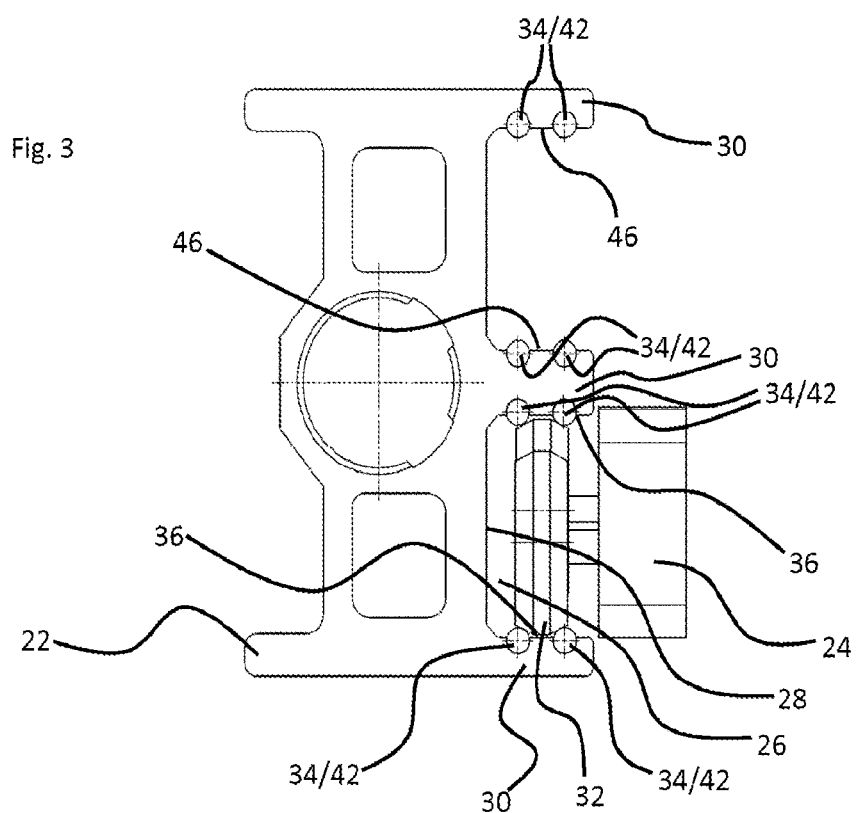

LINEAR GUIDE WITHOUT GUIDE RAIL

CROSS-REFERENCE TO RELATED APPLICATIONS

This application is a 35 U.S.C. § 371 National Stage patent application of PCT/EP2021/078061 filed 11 Oct. 2021, which claims the benefit of German patent application 20 2020 105 924.6 filed 16 Oct. 2020, the disclosures of which are incorporated herein by reference in their entirety.

TECHNICAL FIELD

The present disclosure relates to a guiding device for a door system, in particular a sliding or pivot sliding door system of a public transport vehicle.

The present disclosure further relates to a door system, in particular a sliding or pivot sliding door system, for a public transport vehicle, comprising a door leaf, which can be moved, using a drive unit, from a position closing a door portal of the vehicle into an open position enabling the entry of passengers through the door portal, wherein the door leaf is carried in a carrier guide, the carrier guide comprising a guiding device according to the disclosure.

A public transport "vehicle" may be understood to denote wheeled or railbound vehicles. A wheeled vehicle may be, for example, a bus or other transport vehicle in-tended for passenger transport. A railbound vehicle may be a train (e.g. a high-speed train or a commuter train), a streetcar, a tram, an urban-suburban commuter railway train (S-Bahn), an underground train etc.

The disclosure may relate to passenger doors with one or two leaves, wherein the passenger doors can be configured as a sliding door or a pivot sliding door. For the purpose of simplification, the following explanations relate to a passenger door equipped with one door leaf. Accordingly, the terms and descriptive passages used in the present case, which relate to "one" door leaf, do not exclude the possibility of using the disclosure also in passenger doors with two or more leaves. A "door panel" may also be understood to be synonymous with a "door leaf".

BACKGROUND

Guiding devices for door systems are generally known from the prior art and frequently include recirculating ball bearings, particularly for providing highly precise guides capable of bearing very high loads.

A guiding device with a recirculating ball bearing according to the prior art comprises a guide rail and a slider, which at least partially reaches into the guide rail and is guided in a linearly movable manner in the guide rail via a recirculating ball bearing. The rolling members associated with the recirculating ball bearing are lined up in at least one ball row and guided in at least one partial ball guiding track, most frequently two partial ball guiding tracks. The first partial ball guiding track is formed in the slider and extends along a longitudinal slider axis; the second partial ball track is formed by a slider guiding groove, which is formed on the slider and extends along the longitudinal slider axis, and a guide rail guiding groove, which is situated opposite the slider guide groove and formed on the guide rail. Redirecting means for redirecting the rolling members from the first into the second partial ball guiding grooves and vice versa are respectively formed in the region of, in relation to the longitudinal slider axis, a first and a second slider end.

A guiding device with the features described in the introduction, which is used in a passenger door, is known from EP 1 914 372 A2, for example. The guide rail is attached via slot nuts and screws to a bend- and torsion-resistant carrier profile, which in turn is connected to the vehicle.

The manufacture of a guide rail in accordance with EP 1 914 372 A2 is relatively expensive because, in order to be able to absorb loads, it is made from steel in a drawing process, is then hardened, straightened and provided with surface protection. A drawback of a guiding device configured in this manner—particularly if used in a passenger door of a public transport vehicle—is the relatively large own weight, which also results from the massive design, and the relatively large construction space requirement.

SUMMARY

Accordingly, the present disclosure is based on providing a guiding device for a door system for a public transport vehicle which can be manufactured with as little effort as possible and at low costs. In this case, the own weight and need for construction space are supposed to be as small as possible.

In order to accomplish this advantage, a guiding device is provided having the features of claim 1 and a door system is provided having the features of claim 9.

It must be noted that the features cited individually in the claims can be combined with each other in any technologically meaningful manner and represent other embodiments of the disclosure. The description, in particular in connection with the Figures, additionally characterizes and specifies the disclosure. Also, the features described in connection with a guiding device according to the disclosure may be advantageous embodiments of a door system according to the disclosure and vice versa.

It may also be noted that a conjunction "and/or" used hereinafter, which is situated between two features and links them to each other, should always be interpreted such that, in a first embodiment of the subject matter according to the disclosure, only the first feature may be provided, in a second embodiment, only the second feature may be provided, and in a third embodiment, both the first and the second feature may be provided.

The guiding device according to the disclosure comprises
- a longitudinal profile formed from a first material for attachment to a door portal, which has a guiding track, which is U-shaped in cross section, with a bottom surface and two side walls extending at right angles therefrom,
- a slider, which at least partially reaches into the guiding track and is supported on rolling members in a linearly movable manner in the guiding track, wherein
- a bearing member formed from a second material is disposed in the guiding track, which extends along the guiding track and on which the rolling members supporting the slider roll during a linear movement of the slider, the second material forming the bearing member is harder than the first material forming the longitudinal profile.

In the sense of the disclosure, the term rolling member is used synonymously with all suitable bodies that may roll on bearings, in particular balls, rollers or wheels.

An essential aspect of the disclosure lies in the fact that a guide rail, which is always provided in the prior art, is completely dispensed with. The slider is directly guided in the longitudinal profile, which is firmly connected with the vehicle. By dispensing with the guide rails, considerable savings in costs as well as weight are possible. The effort for installation and maintenance of the guiding device is also considerably reduced.

Further, the applicants have found that it is not necessary to manufacture the entire longitudinal profile, which usually consists of less durable aluminum, from a sufficiently hard and durable material; rather, it is sufficient to provide suitable bearing members in the longitudinal profile, on which the slider can be permanently guided with low wear. According to the disclosure, the bearing members are thus made from a harder material than the longitudinal profile itself. One option, for example, is to manufacture the longitudinal profile itself from aluminum, but the bearing members from steel, preferably from hardened and surface-treated steel.

Advantageously, opposing inner faces of the side walls each have at least one bearing member, wherein a guiding region of the longitudinal profile, in cross section, extends centrally into the cross-sectionally U-shaped guiding track. Thus, rolling members are disposed, in cross section, on both sides of the guiding region between the bearing members and the guiding region.

Advantageously, the bearing members are attached to the longitudinal profile on the inside of the U-shaped guides, so that the rolling members contact the bearing members and roll thereon when the slider moves. In a particularly preferable embodiment, the bearing member are embedded into the longitudinal profile, e.g. in corresponding longitudinal grooves extending along a longitudinal axis of the longitudinal profile or the guiding track in the direction of movement of the slider.

Viewed in cross section, only a portion of the bearing members protrudes from an inner surface of the guiding track. Preferably, more than 50% of the embedded bearing members are located within the bottom or the side walls of the guiding track.

According to the disclosure, the bearing members may be formed by a longitudinally extending track with a concave surface. Advantageously, a single track per side wall of the longitudinal profile is then sufficient. The rolling members run in the concave surface of the bearing members and are thus guided laterally.

In another particularly advantageous embodiment, round bars may also be used as bearing members, which also extend in the longitudinal direction of the longitudinal profile or guiding track. A particular advantage lies in that fact that round bars can be manufactured particularly easily and inexpensively. The surface treatment is also comparatively easily possible. For example, two round bars may be provided, which are arranged directly one next to the other and which possibly even touch one another; alternatively, the two round bars may also be spaced apart. In any case, viewed in cross section, two round bars arranged next to one another also form a kind of concave depression between them, so that the rolling members are securely guided on two round bars. For the case that the round bars are spaced apart, the distance is adapted to the size or the diameter of the rolling members such that the rolling members nevertheless always contact both round bars and are thus guided by both round bars.

The disclosure is suitable both for sliders on which the rolling members, preferably rollers or wheels, are attached, and for using recirculating ball bearings with balls as rolling members known from the prior art. The balls associated with a respective ball row are also in this case respectively guided in a ball guiding track composed of a first and a second partial ball guiding track, wherein the first partial ball guiding tracks are formed in the slider and extend in a parallel arrangement along a longitudinal slider axis, the second partial ball guiding tracks, in contrast to the prior art, are formed directly in the longitudinal profile, namely by a slider guiding groove, which is formed on the slider and extends along the longitudinal slider axis, and a longitudinal profile guiding groove formed in the inner face of the side wall of the longitudinal profile opposite the respective slider guiding groove.

The disclosure not only relates to the use of aluminum for manufacturing the longitudinal carrier and hardened steel for manufacturing the bearing members; alternatively, other suitable materials may also be used.

According to another advantageous embodiment, a carrier configured for carrying a load member, which is detachably connected to the slider, may be provided in a guiding device proposed by the disclosure. A load member may be directly attached to or arranged on such a carrier. A load member may also be indirectly attached to the carrier, i.e. by interposing suitable connecting, carrying or guiding means. An "attachment" does not preclude the carrier from also having guiding or bearing properties in addition to "carrying" a load. The fact that the carrier is detachably connected to the slider simplifies the installation of the guiding device prior to commissioning. Also, the carrier is thus more easily replaceable, e.g. in the case of damage or maintenance.

According to another advantageous embodiment, it may be provided in a guiding device proposed by the disclosure that the load member is a door leaf of a passenger door, in particular of a pivot sliding door or sliding door, of a vehicle. In this case, the carrier portion may have a device for arranging a rotating joint with an axis of rotation parallel to the guide rail, wherein a door leaf bracket can be attached to the rotating joint. The above-described guiding device is thus particularly suitable for holding and guiding a door leaf associated with a door system, e.g. a pivot sliding or sliding door system. Likewise, the guiding device is suitable for holding and guiding one or more (e.g., two) door leaves; the guiding device can thus be used in door systems with one or two door leaves.

The advantage on which the disclosure is based is also accomplished with providing a door system, in particular a sliding or pivot sliding door system, for a public transport vehicle. The door system comprises a door leaf (optionally also several, e.g. two, door leaves), which can be moved, using a drive unit, from a position closing a door portal of the vehicle into an open position enabling the entry of passengers through the door portal, wherein the door leaf is carried in a carrier guide.

The carrier guide comprises a guiding device configured in accordance with the disclosure. In this case, the carrier guide or guiding device is preferably arranged in the upper area of the door portal. In this case, a guiding device according to the disclosure is not limited to a certain type of door system. The guiding device may also be retrofitted into door systems already implemented in a vehicle.

BRIEF DESCRIPTION OF THE DRAWINGS

The disclosure is explained further with reference to the following Figures. They depict exemplary embodiments of the disclosure which are not to be understood to be limiting. In the Figures:

FIG. 3 shows a cross-sectional view of a third embodiment of the disclosure with, in each case, two round bars per side wall as bearing members, and a slider with rollers.

DETAILED DESCRIPTION OF THE DRAWINGS

Figure 1:
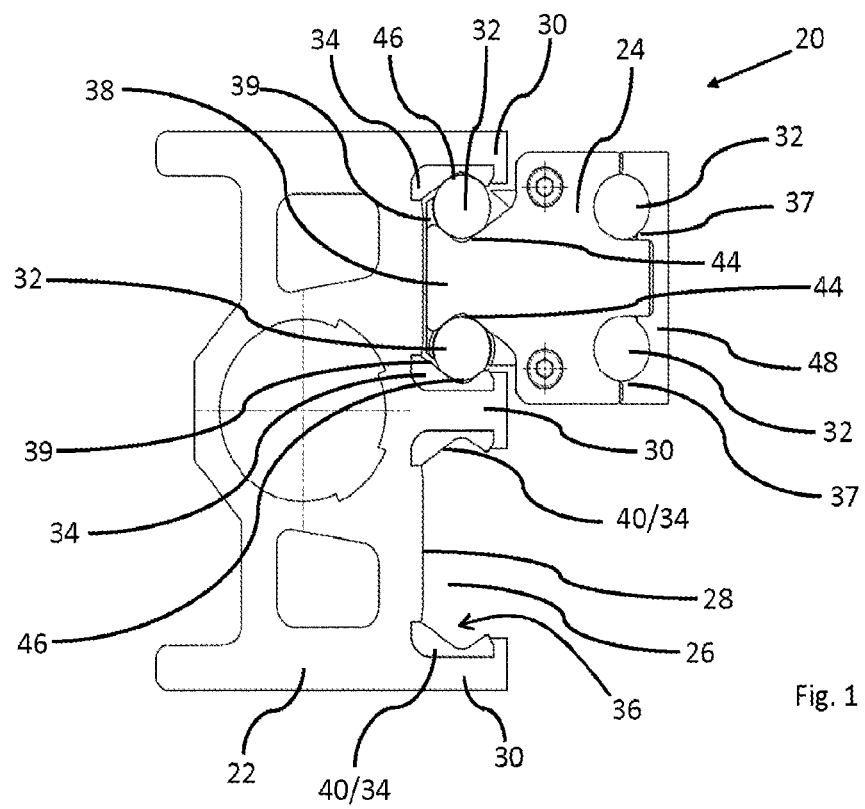
FIG. 1 shows a cross-sectional view of a first embodiment of the disclosure with, in each case, one track per side wall as a bearing member.

The Figures each show cross-sectional views of guiding devices 20 according to the disclosure. A slider 24 guided in a linearly movable manner is disposed in a longitudinal profile 22. With a guiding region 38, the slider 24 reaches at least partially into the longitudinal profile 22, which is configured like a U-shaped profile.

What is depicted is a longitudinal profile 22 with two guiding tracks 26, with a slider 24 being located only in the upper guiding track 26. However, a slider 24 may also be guided in the lower guiding track 26, of course.

The two guiding tracks 26 each have a bottom surface 28 and two side walls 30 extending therefrom at right angles, wherein the two inner side walls 30 of the two guiding tracks 26 are formed by a common web in the illustrated exemplary embodiment.

In the illustrated exemplary embodiment, the linearly movable guidance of the slider 24 in the longitudinal profile 22 is realized by a recirculating ball bearing. The rolling members 32 associated with the recirculating ball bearing are configured as balls and lined up in two ball rows in ball tracks, with the balls 32 associated with a respective ball row being guided in a ball guiding track. The ball guiding track is composed in each case of a first partial ball guiding track 37 and a second partial ball guiding track 39, wherein the first partial ball guiding track 37 is configured in the slider 24 and extends along a longitudinal slider axis. The second partial ball track 39 is formed by a slider guiding groove 44, which is formed on the slider 24 and extends along the longitudinal slider axis, and a longitudinal profile guiding groove 46 formed in the inner face 36 of the side wall 30 of the longitudinal profile 22 opposite the slider guiding groove 44. The recirculating ball bearing is closed off by a cover member 48.

Redirecting means, which are not depicted, for redirecting the balls 32 into the respective partial ball guiding grooves 37, 39 are respectively formed in the region of, in relation to the longitudinal slider axis, a first and a second slider end.

According to the disclosure, the illustrated bearing members 34 consist of a harder and more durable material than the longitudinal profile 22.

In the embodiment shown in FIG. 1, a single track 40 with a concave surface is arranged as a bearing member 34 on the inner faces 36 of the side walls 30. The balls 32 roll on the concave surface of the bearing members 34 and are thus guided laterally. The bearing members 34 are configured to be embedded into the side walls 30 of the longitudinal profile 22.

Figure 2:
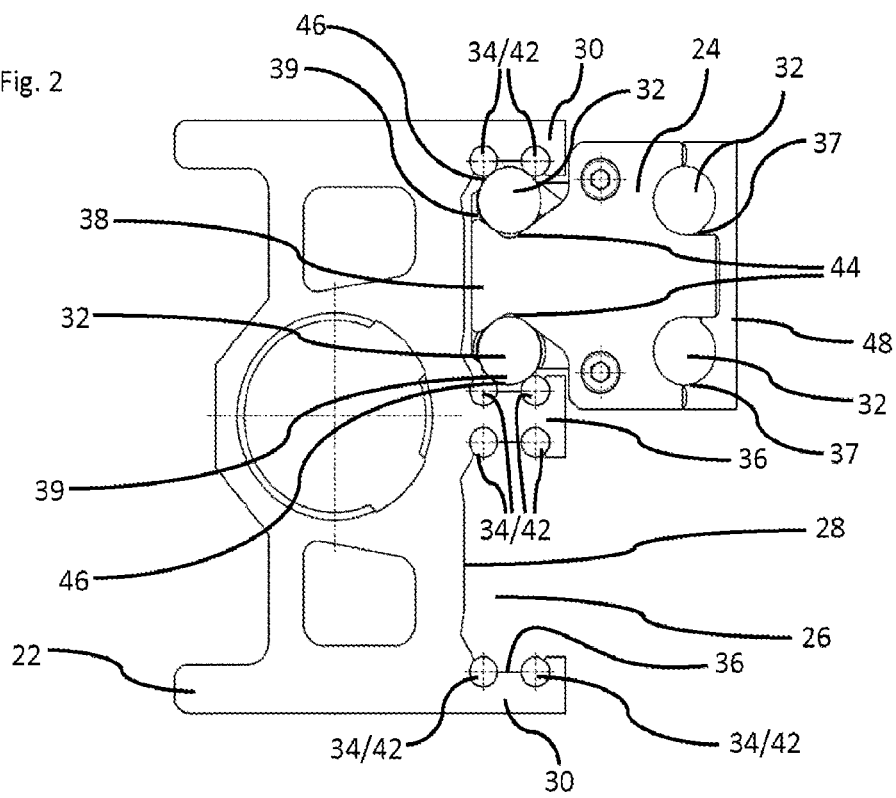
FIG. 2 shows a cross-sectional view of a second embodiment of the disclosure with, in each case, two round bars per side wall as bearing members.

In contrast, FIG. 2 shows a second embodiment according to the disclosure, in which two round bars 42, which extend parallel to each other in the longitudinal direction, are arranged in each case as bearing members 34 on the inner faces 36 of the side walls. The balls 32 contact both round bars 42 in each case and roll on them. Alternatively, the round bars 42 may also be arranged so as to lie directly adjacent to one another. In the illustrated embodiment, the round bars 42 are also each configured to be embedded into the side walls 30.

In another third embodiment of the disclosure, which is shown in FIG. 3, the rolling members 32 are configured as rollers and rotatably mounted on the slider 24, so that the recirculating ball bearing shown may be omitted. In the illustrated exemplary embodiment, round bars 42 are provided as bearing members 34; alternatively, a single track 40 with a concave surface may of course also be provided in each case as a bearing member 34, in analogy to the above-described recirculating ball bearing.

The guiding device 20 may be used, for example, in a door system, which is not depicted, of a vehicle (e.g. a public transport vehicle). The guiding device is primarily suitable for use in a sliding or pivot sliding door system. The door system comprises a door leaf (optionally also several, e.g. two, door leaves), which can be moved, using a drive unit, from a position closing a door portal of the vehicle into an open position enabling the entry of passengers through the door portal, wherein the door leaf is carried in a carrier guide. The carrier guide comprises the abovementioned guiding device. In this case, the carrier guide or guiding device is preferably arranged in the upper area of the door portal. The guiding device may also be retrofitted into door systems already implemented in a vehicle.

The disclosure is not limited to the exemplary embodiments shown, but also includes other variants that are possible on the basis of the disclosure.

The invention claimed is:

1. A door system for a vehicle, the door system comprising:
   a door portal comprising a longitudinal profile formed from a first material for attachment to the door portal, which has a guiding track, which is U-shaped in cross section, with a bottom surface and two side walls extending at right angles therefrom,
   a door leaf, configured to be moved using a drive unit, from a closed position configured to close the door portal of the vehicle into an open position enabling entry of passengers through the door portal,
   a carrier guide connected to the door leaf and arranged in the upper area of the door portal for carrying the door leaf, having a slider, which at least partially reaches into the guiding track and is supported on rolling members in a linearly movable manner directly in the guiding track of the longitudinal profile,
   wherein
   opposing inner faces of the side walls each have at least one bearing member formed from a second material and disposed in the guiding track, on which the rolling members support the slider roll during a linear movement of the slider,
   two round bars extend parallel to each other in the longitudinal direction and are arranged as bearing members on both inner faces of the side walls, wherein the rolling members each roll on both round bars,
   the round bars are embedded in longitudinal grooves extending along a longitudinal axis of the longitudinal profile or the guiding track in the direction of movement of the slider,
   the two round bars are formed from a second material which is harder than the first material forming the longitudinal profile,
   the longitudinal profile and the slider form a guide, whereby the slider is configured to run directly along the longitudinal profile.

2. The door system according to claim 1, wherein
a guiding region of the longitudinal profile, in cross section, extends centrally into the cross-sectionally U-shaped guiding track,
the rolling members of the slider are disposed, in cross section, on both sides of the guiding region between the bearing members and the guiding region.

3. The door system according to claim 1, wherein the round bars are spaced apart.

4. The door system according to claim 1, wherein the rolling members are attached to the slider.

5. The door system according to claim 1, wherein the first material is aluminum and the second material is steel.

\* \* \* \* \*